United States Patent [19]

Reiffenrath et al.

[11] Patent Number: 5,198,149
[45] Date of Patent: Mar. 30, 1993

[54] SMECTIC LIQUID-CRYSTAL MEDIUM

[75] Inventors: Volker Reiffenrath, Rossdorf; Joachim Krause, Dieburg; Andreas Wächtler, Griesheim; Thomas Geelhaar, Mainz, all of Fed. Rep. of Germany; David Coates, Wimborne, United Kingdom; Ian Sage, Broadstone, United Kingdom; Simon Greenfield, Poole, United Kingdom

[73] Assignee: Merck Patent Gesellschaft mit Beschrankter Haftung, Darmstadt, Fed. Rep. of Germany

[21] Appl. No.: 362,469

[22] PCT Filed: Feb. 27, 1989

[86] PCT No.: PCT/EP89/00177

§ 371 Date: May 15, 1989

§ 102(e) Date: May 15, 1989

[87] PCT Pub. No.: WO89/08690

PCT Pub. Date: Sep. 21, 1989

[30] Foreign Application Priority Data

Mar. 10, 1988 [DE] Fed. Rep. of Germany ....... 3807862

[51] Int. Cl.$^5$ ..................... C09K 19/34; C09K 19/32; C09K 19/30; C09K 19/20
[52] U.S. Cl. ........................... 252/299.61; 252/299.62; 252/299.63; 252/299.65; 252/299.66; 252/299.67
[58] Field of Search ....................... 252/299.61, 299.63, 252/299.66, 299.67, 299.65, 299.62

[56] References Cited

U.S. PATENT DOCUMENTS

| 4,368,135 | 1/1983 | Osman | 252/299.63 |
|---|---|---|---|
| 4,415,470 | 11/1983 | Eidenschink et al. | 252/299.63 |
| 4,514,317 | 4/1985 | Tuong et al. | 252/299.62 |
| 4,545,922 | 10/1985 | Eidenschink et al. | 252/299.63 |
| 4,551,264 | 11/1985 | Eidenschink et al. | 252/299.62 |
| 4,602,851 | 7/1986 | Jenner et al. | 359/104 X |
| 4,606,845 | 8/1986 | Romer et al. | 252/299.63 |
| 4,637,897 | 1/1987 | Kelly | 252/299.63 |
| 4,659,502 | 4/1987 | Fearon et al. | 252/299.61 |
| 4,664,840 | 5/1987 | Osman | 252/299.63 |
| 4,710,315 | 12/1987 | Schad et al. | 252/299.63 |
| 4,724,097 | 2/1988 | Romer et al. | 252/299.63 |
| 4,776,973 | 10/1988 | Bofinger et al. | 252/299.61 |
| 4,808,333 | 2/1989 | Huyhh-ba et al. | 252/299.66 |
| 4,820,839 | 4/1989 | Krause et al. | 544/316 |
| 4,834,904 | 5/1989 | Krause et al. | 252/299.01 |
| 4,874,544 | 10/1989 | Yong et al. | 252/299.61 |
| 4,897,216 | 1/1990 | Reiffenrath et al. | 252/299.63 |
| 4,925,278 | 5/1990 | Buchecker et al. | 350/350.5 |
| 4,925,590 | 5/1990 | Reiffenrath et al. | 252/299.63 |
| 4,943,384 | 7/1990 | Sucrow et al. | 252/299.61 |
| 4,985,583 | 1/1991 | Eidenschink et al. | 558/431 |
| 5,087,764 | 2/1992 | Reiffenrath et al. | 568/656 |

FOREIGN PATENT DOCUMENTS

| 0051738 | 3/1981 | European Pat. Off. . |
|---|---|---|
| 0133489 | 7/1984 | European Pat. Off. . |
| 61-229842 | 10/1986 | Japan . |
| 61-229870 | 10/1986 | Japan . |
| WO88/02130 | 3/1988 | World Int. Prop. O. . |

Primary Examiner—Robert L. Stoll
Assistant Examiner—C. Harris
Attorney, Agent, or Firm—Millen, White, Zelano and Branigan

[57] ABSTRACT

Chiral, tilted, smectic liquid-crystal phases containing at least two liquid-crystal components and at least one chiral doping agent, at least one liquid-crystal component being a compound having the structural unit 2,3-difluoro-1,4-phenylene, are distinguished by a very low viscosity and advantageous switching times.

14 Claims, No Drawings

SMECTIC LIQUID-CRYSTAL MEDIUM

The invention relates to chiral, tilted, smectic liquid-crystal media having at least two liquid-crystal components and at least one chiral doping agent, at least one compound containing the structural element 2,3-difluoro-1,4-phenylene, excepting fluorinated oligophenyls of the formula 1

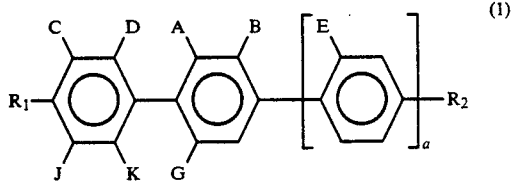

wherein a is 0 or 1 and wherein the terminal substituents $R_1$, $R_2$ and $R_3$ independently of one another are each alkyl or alkenyl radical which has up to 15 C. atoms and is optionally substituted by CN or by at least one halogen atom and in which one or more non-adjacent $CH_2$ groups of these radicals can also be replaced by —O—, —S—, —CO—, —O—CO—, —CO—O—, —O—CO—O— or —C≡—, one of these radicals $R_1$ and $R_2$ is also a group of formula,

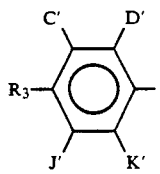

in one of the following pairs of lateral substituents the two substituents are fluorine
(A,B), (C,D), (C',D')
and all the remaining lateral substituents are hydrogen or fluorine.

The invention relates in particular to media which contain at least one compound of the formula I

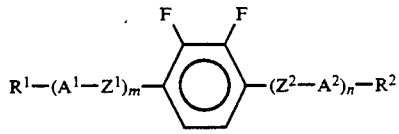

wherein $R^1$ and $R^2$ are alkyl having 1 to 15 C atoms or alkenyl having 3-15 C atoms, each of which, independently of one another, is unsubstituted, monosubstituted by cyano or at least monosubstituted by fluorine or chlorine, it being also possible for a $CH_2$ group in these radicals to be replaced in each case by —O—, —CO—, —O—CO—, —CO—O— or —O—CO—O—, and one of the radicals $R^1$ and $R^2$ also denotes an organic radical $Q^*$ which induces chirality and which has an asymmetric carbon atom, $A^1$ and $A^2$, independently of one another, are each 1,4-phenylene wherein one or two CH groups can also be replaced by N, 1,4-cyclohexylene wherein one or two non-adjacent $CH_2$ groups can also be replaced by O atoms and/or S atoms, piperidine-1,4-diyl, 1,4-bicyclo(2,2,2)octylene, 1,3,4-thiadiazole-2,5-diyl, naphthalene-2,6-diyl or 1,2,3,4-tetrahydronaphthalene-2,6-diyl, each of which is unsubstituted or substituted by one or two F and/or Cl atoms and/or $CH_3$ groups and/or CN groups, $Z^1$ and $Z^2$ are each —CO—O—, —O—CO—, —$CH_2CH_2$—, —$OCH_2$—, —$CH_2O$—, —C≡C— or a single bond, m and n are each 0, 1 or 2 and (m+n) is 1 or 2, subject to the proviso that one or two of the groups $Z^1$ and/or $Z^2$ present in the molecule of the formula I are —CO—O—, —O—CO—, —$CH_2CH_2$—, —$OCH_2$—, —$CH_2O$— or —C≡C—, if $A^1$ and $A^2$ independently of one another are each 1,4-phenylene which is unsubstituted or substituted by one or two F atoms.

Compounds of the formula 1 and/or chiral, tilted, smectic, liquid-crystal media containing oligophenyls of the formula 1 form the subject of International Patent Application PCT/EP 88/00724.

Chiral, tilted, smectic liquid-crystal media having ferroelectric properties can be prepared by adding a suitable chiral doping agent to base mixtures containing one or more tilted smectic phases (L. A. Beresnev et al., Mol. Cryst. Liq. Cryst. 89, 327 (1982); H. R. Brand et al., J. Physique 44 (lett.), L-771 (1983)). Phases of this type can be used as dielectrics for high-speed displays based on the principle of SSFLC technology described by Clark and Lagerwall (N. A. Clark and S. T. Lagerwall, Appl. Phys. Lett. 36, 899 (1980); U.S. Pat. No. 4,367,924), based on the ferroelectric properties of the chiral, tilted medium. In this medium, the longitudinally extended molecules are arranged in layers and the molecules have an angle of tilt to the layer perpendicular. In proceeding from layer to layer, the direction of tilt changes by a small angle in respect to an axis vertical to the layers, so that a helical structure is formed. In displays based on the SSFLC technology, the smectic layers are arranged perpendicularly to the plates of the cell. The helical arrangement of the directions of tilt of the molecules is suppressed by means of a very small distance between the plates (approx. 1-2 μm). By this means, the longitudinal axes of the molecules are forced to arrange themselves in a plane parallel to the plates of the cell, as a result of which two distinct tilt orientations are formed. By applying a suitable electric alternating field, it is possible to switch backwards and forwards between these two states in the liquid-crystal medium having a spontaneous polarization. This switching process is appreciably faster than in the case of conventional twisted cells (TN-LCDs) based on nematic liquid crystals.

A great disadvantage for many applications of the materials having chiral, tilted smectic phases (such as, for example, Sc*, but also $S_H^*$, $S_I^*$, $S_J^*$, $S_K^*$, $S_G^*$, $S_F^*$) available at the present time is their low stability to chemicals, heat and light. A further disadvantageous property of displays based on chiral, tilted, smectic media available at the present time is that the spontaneous polarization has excessively low values, so that the switching time behavior of the displays is unfavourably affected and/or the pitch and/or the tilt and/or the viscosity of the phases does not meet the requirements of display technology. In addition, in most cases the temperature range of the ferroelectric media is too small and is situated for the most part at excessively high temperatures.

It has now been found that the use of compounds of formula I as components of chiral, tilted, smectic media can appreciably reduce the disadvantages mentioned. The compounds of formula I are thus excellently suitable for use as components of chiral, tilted, smectic liquid-crystal media. In particular it is possible with their aid to prepare chiral, tilted, smectic liquid-crystal media which are particularly stable to chemicals and have advantageous ferroelectric phase ranges and advantageous widths of viscosity, in particular having broad Sc* phase ranges and an excellent capacity for being supercooled down to temperatures below 0° C. without crystallization occurring, and high values of spontaneous polarization for phases of this type. P is the spontaneous polarization in $nC/cm^2$.

The compounds of formula I have a wide range of applications. Depending on the selection of the substituents, these compounds can be used as the base materials of which liquid-crystal, smectic media are mostly composed; it is also possible, however, to add compounds of the formula I to liquid-crystal base materials belonging to other classes of compounds in order, for example to vary the dielectric and/or optical anisotropy and/or the viscosity and/or the spontaneous polarization and/or the phase range and/or the tilt angle and/or the pitch of such a dielectric.

The invention therefore relates to a chiral, tilted, smectic liquid-crystal medium containing at least two liquid-crystal components and at least one chiral doping agent, this medium containing at least one compound containing the structural unit 2,3-difluoro-1,4-phenylene, and to the use of compounds of this type, in particular those of the formula I, as components of chiral, tilted, smectic liquid-crystal media. The invention also relates to electrooptical display elements, in particular ferroelectric, electrooptical display elements, containing media of this type.

The media according to the invention preferably contain at least two, especially at least three compounds of formula I. Chiral, tilted, smectic liquid-crystal media according to the invention which are particularly preferred are those in which an achiral base mixture contains, as well as compounds of the formula I, at least one other component having a dielectric anisotropy of low value, a low viscosity and a broad S phase range. These further component(s) of the achiral base mixture can amount, for example, to 40 to 90%, preferably 50 to 80%, of the base mixture. Possible suitable components are, in particular, compounds of the partial formulae IIa to IIh:

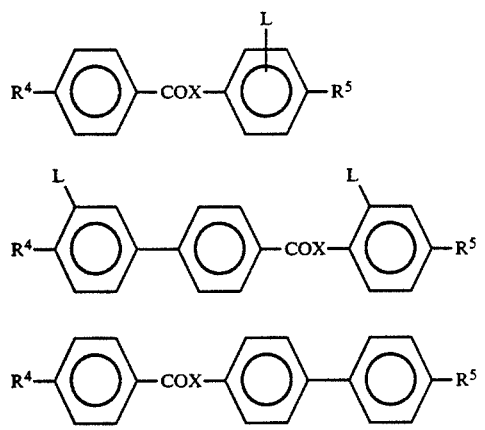

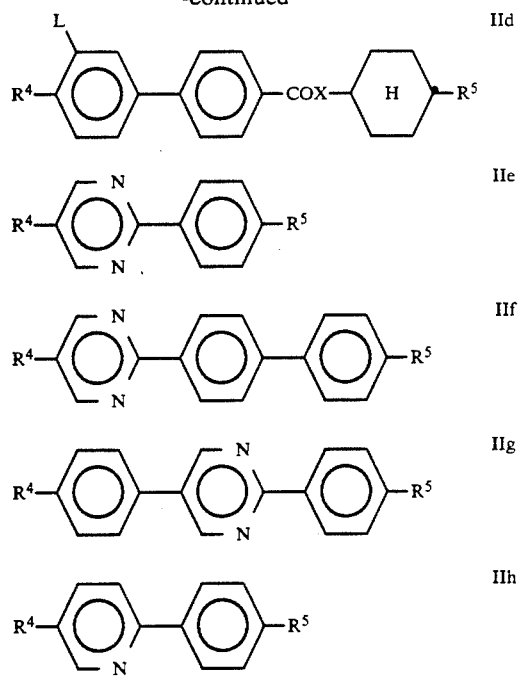

$R^4$ and $R^5$ are each preferably alkyl, alkoxy, alkanoyloxy or alkoxycarbonyl having in each case 3 to 12 C atoms. X is preferably O. In the compounds of the formulae IIa to IIg, a 1,4-phenylene group can also be substituted laterally by halogen, particularly preferably by fluorine. Preferably, one of the groups $R^4$ or $R^5$ is alkyl and the other group is alkoxy. The Ls independently of one another are each H or F. In IIa the F atom can be in the ortho-position or meta-position relative to $R^5$.

The compounds of the partial formulae IIa to IIh wherein $R^4$ and $R^5$ are each linear alkyl or alkoxy having in each case 5 to 10 C atoms are particularly preferred.

Media according to the invention which are also preferred are those which, as well as components of the formulae IIa to IIg, also contain at least one component having a markedly negative dielectric anisotropy ($\Delta\epsilon \leq -2$). Compounds of the formulae IIIa to IIIc

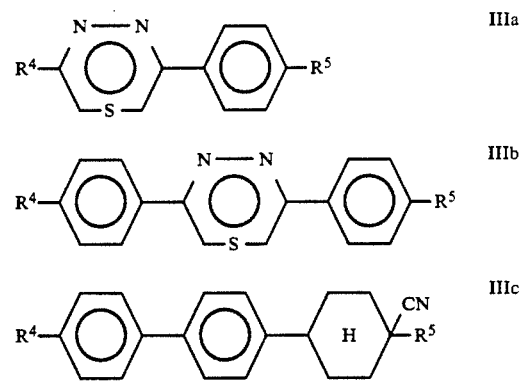

wherein $R^4$ and $R^5$ have the general and preferred meanings indicated in the formulae IIa to IIg are particularly suitable in this regard. In the compounds of the formulae IIIa, IIIb and IIIc, a 1,4-phenylene group can also be substituted laterally by halogen, preferably fluorine.

The compounds of the formula I embrace, in particular dinuclear and trinuclear materials. Of the dinuclear materials, which are preferred, preferred materials are those wherein $R^1$ is n-alkyl or n-alkoxy having 7 to 12, in particular 7 to 9, C atoms.

Compounds of the formula I wherein $R^1$ is n-alkyl having 7 to 10 C atoms and $R^2$ is n-alkanoyloxy, n-alkoxycarbonyl or n-alkylthio having in each case 5 to 10 C atoms are also preferred.

The media according to the invention preferably contain at least one trinuclear compound of the formula I. These media are distinguished by particularly high $S_C/S_A$ transition temperatures.

In formula I $R^1$ and $R^2$, independently of one another, are each preferably alkyl or alkoxy having 5 to 15 C atoms.

$A^1$ and $A^2$ are preferably Cy or Ph. In the compounds of the preceding and following formulae, Ph is preferably a 1,4-phenylene (Phe) group, a pyrimidine-2,5-diyl (Pyr) group, a pyridine-2,5-diyl (Pyn) group, a pyrazine-3,6-diyl group or a pyridazine-2,5-diyl group, particularly preferably Phe, Pyr or Pyn. The compounds according to the invention preferably contain not more than one 1,4-phenylene group, wherein one or two CH groups have been replaced by N. Cy is preferably a 1,4-cyclohexylene group. Compounds of the formula I, which are particularly preferred are, however, those wherein one of the groups $A^2$, $A^3$ and $A^4$ is a 1,4-cyclohexylene group which is substituted in the 1-position or 4-position by CN and the nitrile group is also located in an axial position, i.e. the group $A^2$, $A^3$ or $A^4$, as in the following configuration:

Compounds of the formula I and of the above partial formulae containing a grouping —Ph—Ph— are particularly preferred. —Ph—Ph— is preferably —Phe—Phe—, —Phe—Pyr or Phe—Pyn. The groups

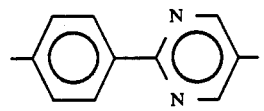

and

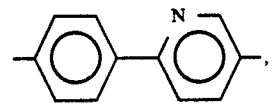

and also 4,4'-biphenylyl which is unsubstituted or monosubstituted or polysubstituted by fluorine are particularly preferred.

$Z^1$ and $Z^2$ are preferably single bonds; —O—CO—, —CO—O—, —C≡C— or —CH$_2$CH$_2$— groups are a second preference. Preferably, only one of the groups $Z^1$ and $Z^2$ present in the molecule is other than a single bond. $Z^1=Z^2=$single bond is particularly preferred.

Preferred branched radicals $R^1$ or $R^2$ are isopropyl, 2-butyl (=1-methylpropyl), isobutyl (=2-methylpropyl), tert.-butyl, 2-methylbutyl, isopentyl (=3-methylbutyl), 2-methylpentyl, 3-methylpentyl, 4-methylpentyl, 2-ethylhexyl, 5-methylhexyl, 2-propylpentyl, 6-methylheptyl, 7-methyloctyl, isopropoxy, 2-methylpropoxy, 2-methylbutoxy, 3-methylbutoxy, 2-methylpentoxy, 3-methylpentoxy, 2-ethylhexoxy, 1-methylhexoxy, 1-methylheptoxy, 2-oxa-3-methylbutyl, 3-oxa-4-methylpentyl.

In the compounds of the formula I and also in the preceding and following partial formulae, —($A^1$—$Z^1$—)$_m$—PheF$_2$—($Z^2$—$A^2$)$_n$— is preferably a group of the formulae 1 to 16 below or a mirror image thereof:

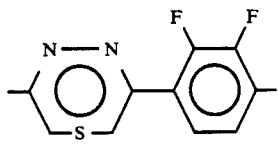

1

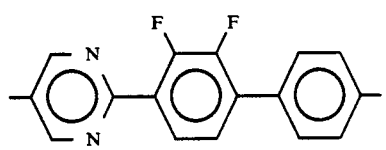

2

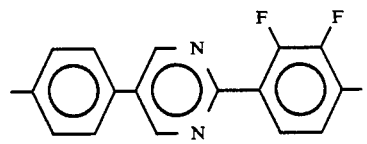

3

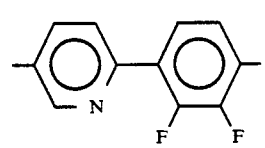

4

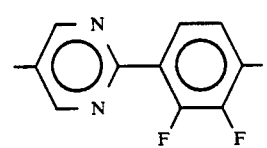

5

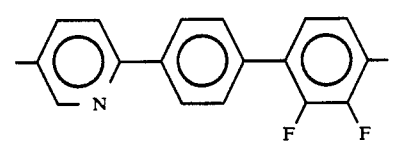

6

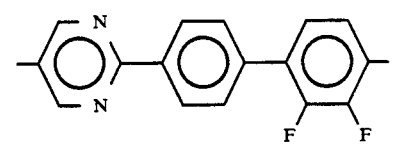

7

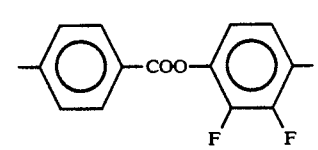

8

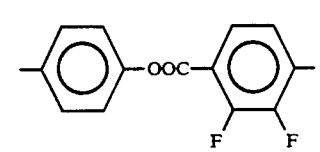

9

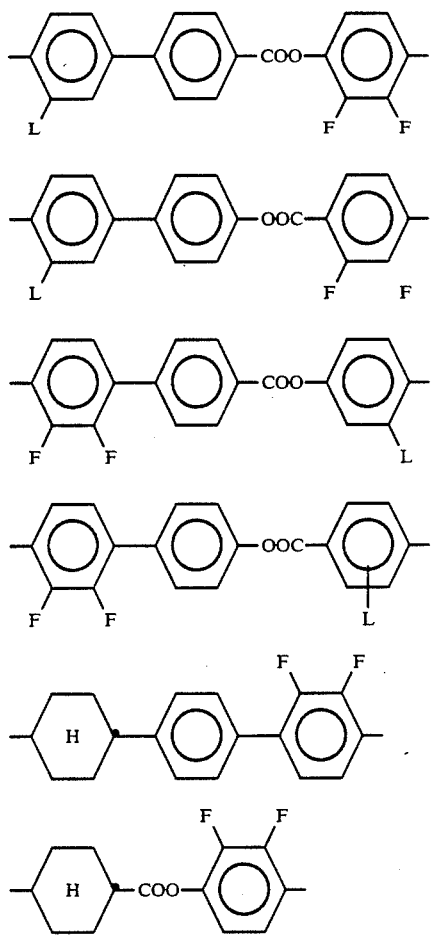

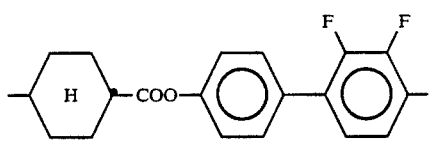

Groups of the formulae 1, 3, 4, 5, 7, 8, 10, 11, 12 and 13, particularly those of the formulae 1, 3 and 10-13, are particularly preferred. L is H or F.

The radical $R^1$ can also be an optically active organic radical containing an asymmetric carbon atom. The asymmetric carbon atom is then preferably attached to two differently substituted C atoms, an H atom and a substituent selected from the group comprising halogen (especially F, Cl or Br), alkyl or alkoxy having in each case 1 to 5 C atoms and CN. The optically active organic radical $R^1$ or $Q^*$ preferably has the formula

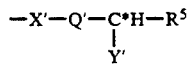

wherein X' is —CO—O, —O—CO—, —O—CO—O—, —CO—, —O—, —S—, —CH=CH—, —CH=CH—COO— or a single bond, Q' is alkylene which has 1 to 5 C atoms and in which a $CH_2$ group not attached to X' can be replaced by —O—, —CO—, —O—CO—, —CO—O— or —CH=CH—, or is a single bond, Y' is CN, halogen, methyl or methoxy, and $R^5$ is an alkyl group different from Y which has 1 to 15 C atoms and in which one or two non-adjacent $CH_2$ groups can be replaced by —O—, —CO—, —O—CO—, —CO—O— and/or —CH=CH—.

X' is preferably —CO—O—, —O—CO—, —CH=CH—COO—(trans) or a single bond. —CO—O/—O—CO— or a single bond is particularly preferred.

Q' is preferably —$CH_2$—, —$CH_2CH_2$—, —$CH_2CH_2CH_2$— or a single bond, particularly preferably a single bond.

Y' is preferably $CH_3$, —CN, F or Cl, particularly preferably CN or F.

$R^5$ is preferably linear or branched alkyl having 1 to 10, in particular 1 to 7, C atoms.

Compounds of the formula I'

$$R^1-(A^1-Z^1)_m-\underset{F\ F}{\underset{|\ |}{\bigcirc}}-(Z^2-A^2)_n-Q^1-C^*R^oX-Q^2-R^2$$

wherein $Q^1$, $Q^2$, $R^o$ and X have the meanings indicated in claim 2 are particularly preferred. $R^o$ is an alkyl group different from X and $Q^2-R^2$ which preferably has 1 to 5 C atoms. Methyl and ethyl, especially methyl, are particularly preferred. $R^2$ is preferably an alkyl group having 2 to 10, in particular 2 to 6, C atoms. $Q^1$ and $Q^2$, independently of one another, are each preferably —O—CO— (the carbonyl carbon atom being attached to the asymmetric C atom C*), —O—$CH_2$— (the methylene group being attached to the asymmetric C atom C*), —$CH_2CH_2$—, —$CH_2$— or a single bond (—). Combinations of $Q^1$ and $Q^2$ which are particularly preferred are indicated in the table below:

| $Q^1$ | —O—CO— | —O—$CH_2$— | —$CH_2$— | —$CH_2CH_2$— | —$CH_2$— | —$CH_2CH_2$— |
|---|---|---|---|---|---|---|
| $Q^2$ | — | — | —CO—O— | —CO—O— | —$CH_2$—O— | —$CH_2$—O— |

In the preferred compounds of the preceding and following formulae, it is possible for the alkyl radicals, in which a $CH_2$ group (alkoxy or oxaalkyl) can also be replaced by an O atom, to be linear or branched. They preferably have 5, 6, 7, 8, 9 or 10 C atoms and accordingly are preferably pentyl, hexyl, heptyl, octyl, nonyl, decyl, pentoxy, hexoxy, heptoxy, octoxy, nonoxy or decoxy, and also ethyl, propyl, butyl, undecyl, dodecyl, propoxy, ethoxy, butoxy, undecyloxy, dodecyloxy, 2-oxapropyl (=2-methoxymethyl), 2-oxabutyl (=ethoxymethyl) or 3-oxabutyl (=2-methoxyethyl), 2-, 3- or 4-oxapentyl, 2-, 3-, 4- or 5-oxahexyl or 2-, 3-, 4-, 5- or 6-oxaheptyl.

A medium according to the invention which is particularly preferred is one containing at least 25% of one or more compounds of the formula II

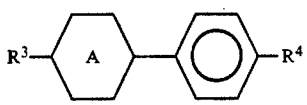

wherein $R^3$ and $R^4$, independently of one another, are each alkyl which has 1 to 15 C atoms or alkenyl which has 3 to 15 C atoms, each of which is unsubstituted, monosubstituted by cyano or at least monosubstituted by fluorine or chlorine, it being also possible for a CH$_2$ group to be replaced by —O—, —O—CO—, —CO—O— or —O—CO—O— in each of these radicals, and Ring A is pyrimidine-2,5-diyl or pyridine-2,5-diyl.

Compounds of the formulae IIe, and/or IIh wherein R$^4$ and R$^5$ are, independently of one another, each alkyl, alkoxy, alkanoyloxy or alkoxycarbonyl having in each case 3 to 12 C atoms are preferably present.

A medium which contains one or more compounds of the formulae IId and/or IIh and, at the same time, one or more compounds of the formula IIg is particularly preferred. A preferred medium contains 2 to 25% of a chiral doping agent which preferably has an S$_c$*phase.

A preferred medium contains 8 to 50% of one or more compounds which have a 2,3-difluoro-1,4-phenylene structural unit and which preferably correspond to the formula I.

Compounds of the formula Ia'

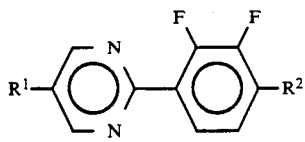

wherein R$^1$ and R$^2$ have the meaning indicated are preferred.

Q* is preferably a radical of formula

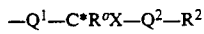

wherein Q$^1$ and Q$^2$ independently of one another are each alkylene which has 2 to 4 C atoms and in which a CH$_2$ group can also be replaced by —O—, —S—, —CO—, —O—CO—, —CO—O—, —S—CO—, —CO—S—, —CH=CH—COO—, —CH=CH—, —CHHalogen and/or —CHCN—, or are each a single bond, X is halogen, CN, CH$_3$, CH$_2$CN or OCH$_3$, R$^o$ is H or an alkyl group having 1 to 10 C atoms which is different from X and —Q$^2$—R$^2$, and C* is a carbon atom attached to four different substituents.

A preferred medium contains one or more compounds of the formulae Ia, Ib or Ic

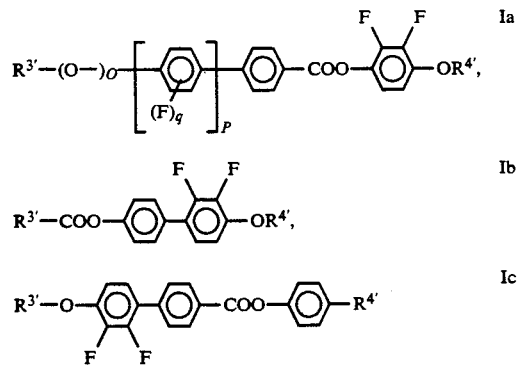

wherein R$^3$, and R$^4$, independently of one another, are each alkyl having 1 to 15 C atoms and o, p and q are each 0 or 1.

Media according to the invention containing only compounds of the formula I wherein m =0 are also preferred. These media are distinguished by a particularly advantageous low temperature behavior and particularly low viscosity values. Media according to the invention containing compounds of formula I wherein at least one group R$^1$ or R$^2$ is a branched-chain, alkyl or alkoxy radical are also preferred. These media also exhibit an advantageous low temperature behavior.

R$^1$ and R$^2$, independently of one another, are each preferably alkyl, alkoxy, alkanoyl, alkanoyloxy, alkoxycarbonyl or alkoxycarbonyloxy, preferably having in each case 5 to 12, in particular 6 to 10 C atoms. Alkyl and alkoxy are particularly preferred. One of the groups R$^1$ and R$^2$ is preferably alkyl. A particularly preferred combination is R$^1$=alkyl and R =alkoxy, and also R$^1$=alkoxy and R$^2$=alkyl. R$^1$ and R$^2$ groups having a linear alkyl radical are particularly preferred.

Media which, in addition to one or more compounds of the formula I, contain one or more oligophenyl compounds of the formula 1 are also preferred.

The media according to the invention contain one or more chiral components. The present invention also relates to the corresponding base mixtures (i.e., the achiral part) which contain a tilted, smectic phase (for example S$_C$). By adding one or more doping agents those skilled in the art can obtain chiral, tilted, smectic media without inventive assistance. Preferred doping agents are those corresponding to WO 86/06373, WO 87/05018, German Offenlegungsschrift 3,638,026, German Offenlegungsschrift 3,807,802, German Offenlegungsschrift 3,843,128 and British Patent Applications 8,615,316, 8,629,322, 8,724,458, 8,729,502, 8,729,503, 8,729,865 and 8,729,866.

All the components of the media according to the invention are either known or can be prepared in a manner known per se analogously to known compounds.

The compounds having the structural unit 2,3-difluoro-1,4-phenylene are prepared by methods known per se, such as are described in the literature (for example in the standard works such as Houben-Weyl, Methoden der Organischen Chemie "Methods of Organic Chemistry", Georg-ThiemeVerlag, Stuttgart), specifically under reaction conditions which are known and suitable for the reactions mentioned. In this regard, it is also possible to make use of variants which are known per se but are not mentioned here in detail.

If desired, the starting materials can also be formed in situ by a process in which they are not isolated from the reaction mixture, but are immediately reacted further to give the target compounds.

Compounds of the formula I are accessible using 1,2-difluorobenzene as starting material. This is metalated according to a known process (for example A. M. Roe et al., J. Chem. Soc. Comm., 22, 582 (1965)) and reacted with the appropriate electrophile. Using the 1-substituted 2,3-difluorobenzene thus obtained, this reaction sequence can be carried out a second time with a suitable electrophile, thus affording the 1,4-disubstituted 2,3-difluorobenzenes which are suitable for the synthesis of the heterocyclic compounds. 1,2-Difluorobenzene or 1-substituted 2,3-difluorobenzene is reacted, in an inert solvent, such as diethyl ether, tetrahydrofuran, dimethoxyethane, tert.-butyl methyl ether or dioxane, hydrocarbons, such as hexane, heptane, cyclohexane, benzene or toluene or mixtures of these solvents, if appropriate with an addition of a complexing agent such as tetramethylethylenediamine (TMEDA) or hexamethylphosphoric triamide, with phenyllithium, lithium tetramethylpiperidine or n-, sec.- or tert.-butyllithium at temperatures from $-100°$ C. to $+50°$ C., preferably $-78°$ C. to $0°$ C.

The lithium-2,3-difluorophenyl compounds are reacted with the corresponding electrophiles at $-100°$ C. to $0°$ C., preferably at $-50°$ C. Suitable electrophiles are aldehydes, ketones, nitriles, epoxides, carboxylic acid derivatives, such as esters, anhydrides or halides, halogenoformic acid esters or carbon dioxide.

For reaction with aliphatic or aromatic halogen compounds, the lithium-2,3-difluorophenyl compounds are transmetalated and coupled by catalysis with transition metals. The zinc-2,3-difluorophenyl (compare German Offenlegungsschrift 3,632,410) or the titanium-2,3-difluorophenyl (compare German Offenlegungsschrift 3,736,489) compounds are particularly suitable for this reaction.

The new compounds of the formula I are the subject of the following German patent applications of the same application date:

| | |
|---|---|
| Derivatives of 2,3-difluorohydroquinone | (P 3,807,801) |
| Derivatives of 2,3-difluorobenzoic acid | (P 3,807,823) |
| Derivatives of 2,3-difluorophenol | (P 3,807,803) |
| Phenyl difluorobenzoates | (P 3,807,870) |
| Derivatives of 2,3-difluorophenol | (P 3,807,819) |
| 2,3-Difluorobiphenyls | (P 3,807,861) |
| Heterocyclic derivatives of 1,2-difluorobenzene | (P 3,807,871) |
| Chiral derivatives of 1,2-difluorobenzene | (P 3,807,802) |

The compounds described therein are preferred compounds of the formula I.

The preparation of the media according to the invention is effected in a manner customary per se. As a rule, the components are dissolved in one another, preferably at an elevated temperature.

By means of suitable additives, it is possible to modify the liquid-crystal media according to the invention in such a way that they can be used in all types of liquid-crystal display elements hitherto disclosed.

The following examples are intended to illustrate the invention without limiting it. In the preceding and following text, percentages are percent by weight; all the temperatures are quoted in degrees centigrade. The values of spontaneous polarization apply to room temperature. The following abbreviations are also used: C: crystalline-solid state, S: smectic phase (the index characterizes the type of phase), N: nematic state, Ch: cholesteric phase, I: isotropic phase. The number between two symbols indicates the transition temperature in degrees centigrade.

EXAMPLE 1

A liquid-crystal medium consisting of
8% of 2-p-heptyloxyphenyl-5-octylpyrrmidine,
10% of 2-p-octyloxyphenyl-5-octylpyrimidine,
14% of 2-p-nonyloxyphenyl-5-octylpyrimidine,
3% of 2-p-hexyloxyphenyl-5-nonylpyrimidine,
23% of 2-p-nonyloxyphenyl-5-nonylpyrrmidine,
7% of 2-(2,3-difluoro-4-nonyloxyphenyl)-5-octylpyrimidine,
9% of 2-(2,3-difluoro-4-nonyloxyphenyl)-5-nonylpyrimidine,
8% of 2-(p-pentyloxyph-enyl)-5-(p-octylphenyl)-1,3,4-thiadiazole,
8% of 2-(p-heptyloxyph-enyl)-5-(p-octylphenyl)-1,3,4-thiadiazole and
10% of optically active 4'-octyloxybiphenyl-4-yl 2-cyano-2-methylhexanecarboxylate
has $S^*_c\, 61\, S_A\, 66\, Ch\, 72\, I$ and a spontaneous polarization of 18 nC/cm² at room temperature.

EXAMPLE 2

A liquid-crystal medium consisting of
4% of 2-p-octyloxyphenyl-5-heptylpyrimidine,
4% of 2-p-nonyloxyphenyl-5-heptylpyrimidine,
7% of 2-p-hexyloxyphenyl-5-nonylpyrimidine,
12% of 2-p-heptyloxyphenyl-5-nonylpyrimidine,
25% of 2-p-nonyloxyphenyl-5-nonylpyrimidine,
8% of 2-(2,3-difluoro-4-nonyloxyphenyl)-5-nonylpyrimidine,
8% of 2-(2,3-difluoro-4-octyloxybiphenyl-4'-yl)-5-heptylpyrimidine,
8% of r-1-cyano-cis-4-(4'-octyloxybiphenyl-4-yl)-1-octylcyclohexane,
7% of 2-(p-heptyloxyphenyl)-5-(p-pentylphenyl)-1,3,4-thiadiazole,
7% of 2-(p-octyloxyphenyl)-5-(p-heptylphenyl)-1,3,4-thiadiazole and
10% of chiral ethyl 2-[p-(5-nonylpyrimidin-2-yl)phenoxy]-propionate
has $S^*_c\, 58\, S_A\, 64\, Ch\, 75\, I$ and a spontaneous polarization of 10 nC/cm² at room temperature.

EXAMPLE 3

A liquid-crystal medium consisting of
6% of 4-octyloxyphenyl 4-decyloxybenzoate,
9% of 4-nonyloxyphenyl 4-decyloxybenzoate,
14% of 4-decyloxyphenyl 4-decyloxybenzoate,
5% of 2,3-difluoro-4-octyloxyphenyl 4-octyloxybenzoate,
7% of 2,3-difluoro-4-octyloxyphenyl 4-decyloxybenzoate,
9% of 2,3-difluoro-4-decyloxyphenyl 4-decyloxybenzoate,
4% of 2,3-difluoro-4-nonanoyloxyphenyl 4-octyloxybenzoate,
10% of 4'-pentyloxybiphenyl-4-yl 4-octyloxybenzoate,
8% of 4'-heptyloxybiphenyl-4-yl 4-octyloxybenzoate,
17% of r-1-cyano-cis-4-(4'-octyloxybiphenyl-4-yl)-1-octylcyclohexane and
11% of chiral p-(5-heptylpyrimidin-2-yl)-phenyl 2-chloro-3-methylbutyrate
has $S^*_c\, 62\, S_A\, 68\, Ch\, 81\, I$ and a spontaneous polarization of 138 nC/cm² at room temperature.

EXAMPLE 4

A liquid-crystal medium consisting of
8% of 2-p-octyloxyphenyl-5-octylpyrimidine,
10% of 2-p-nonyloxyphenyl-5-octylpyrimidine,
12% of 2-p-octyloxyphenyl-5-nonylpyrimidine,
20% of 2-p-nonyloxyphenyl-5-nonylpyrimidine,
7% of 2,3-difluoro-4-decyloxyphenyl 4-decyloxybenzoate,
7% of 2,3-difluoro-4-octyloxyphenyl 4-decyloxybenzoate,
9% of 2-(p-heptylphenyl)-5-(p-hexyloxyphenyl)-1,3,4-thiadiazole,
9% of 2-(p-heptylphenyl)-5-(p-octyloxyphenyl)-1,3,4-thiadiazole,
8% of 2,3-difluoro-4-octanoyloxyphenyl 4-(5-hexylpyrimidin-2-yl)-2-fluorobenzoate and 10% of chiral isopropyl 2-[p-(p-decyloxyphenyl)-phenoxyl]-propionate has S*$_c$ 58 S$_A$ and a spontaneous polarization of 11 nC/cm$^2$ at room temperature.

EXAMPLE 5

A liquid-crystal medium consisting of
3% of 2-p-heptyloxyphenyl-5-heptylpyrimidine,
5% of 2-p-nonyloxyphenyl-5-heptylpyrimidine,
7% of 2-p-hexyloxyphenyl-5-nonylpyrimidine,
22% of 2-p-nonyloxyphenyl-5-nonylpyrimidine,
5% of 2-(5-octylpyridyl) 2,3-difluoro-4-heptyloxybenzoate,
9% of [4-(5-octylpyridin-2-yl)-phenyl]2,3-difluoro-4-octyloxybenzoate,
7% of r-1-cyano-cis-4-(4'-heptylbiphenyl-4-yl)-1-hexylcyclohexane,
12% of r-1-cyano-cis-4-(4'-octylbiphenyl-4-yl)-1-butylcyclohexane,
20% of r-1-cyano-cis-4-(4'-nonyloxybiphenyl-4-yl)-1-octylcyclohexane and
10% of optically active p-(5-nonylpyrimidin-2-yl)phenyl 2-cyano-2-methylhexanoate has S*$_c$ 64 S$_A$ 76 Ch 85 I and a spontaneous polarization of 21 nC/cm$^2$ at room temperature.

EXAMPLE 6

A liquid-crystal medium consisting of
6% of 2-p-octyloxyphenyl-5-octylpyrimidine,
8% of 2-p-nonyloxyphenyl-5-octylpyrimidine,
6% of 2-p-octyloxyphenyl-5-nonylpyrimidine,
24% of 2-p-nonyloxyphenyl-5-nonylpyrimidine,
7% of 2-(5-nonylpyrimidyl) 2,3-difluoro-4-nonyloxybenzoate
5% of [4-(5-heptylpyrimidin-2-yl)-phenyl] 2,3-difluoro-4-octyloxybenzoate,
8% of 2-(p-heptyloxyphenyl)-5-(p-pentylphenyl)-1,3,4-thiadiazole,
9% of 2-(p-octyloxyphenyl)-5-(p-heptylphenyl)-1,3,4-thiadiazole,
15% of r-1-cyano-cis-4-(4'-octyloxybiphenyl-4-yl)-1-hexylcyclohexane and
12% of optically active p-(5-octylpyrimidin-2-yl)phenyl 2-chloro-3-methylbutyrate has S*$_c$ 63 S$_A$ 67 Ch 72 I and a spontaneous polarization of 15 nC/cm$^2$ at room temperature.

EXAMPLE 7

A liquid-crystal medium consisting of
3% of 2-p-heptyloxyphenyl-5-heptylpyrimidine,
3% of 2-p-nonyloxyphenyl-5-heptylpyrimidine,
8% of 2-p-octyloxyphenyl-5-nonylpyrimidine,
22% of 2-p-nonyloxyphenyl-5-nonylpyrimidine,
8% of 2,3-difluoro-4-hexyloxyphenyl 4-(5-heptylpyrimidine-2-yl)-benzoate,
10% of 2,3-difluoro-4-decyloxyphenyl 5-heptylpyridine-2-carboxylate,
6% of 2,3-difluoro-4-ethoxyethylphenyl 2-fluoro-4-(5-hexylpyrimidin-2-yl)-benzoate,
10% of r-1-cyano-cis-4-(4'-octylbiphenyl-4-yl)-1-butylcyclohexane,
20% of r-1-cyano-cis-4-(4'-nonyloxybiphenyl-4-yl)-1-octylcyclohexane and
10% of optically active 4'-hexyloxybiphenyl-4-yl 2-cyano-2-methylhexanoate has S*$_c$ 66 S$_A$ 71 Ch 81 I and a spontaneous polarization of 19 nC/cm$^2$ at room temperature.

EXAMPLE 8

A liquid-crystal medium consisting of
11% of 4-octyloxyphenyl 4-decyloxybenzoate,
13% of 4-decyloxyphenyl 4-decyloxybenzoate,
8% of 4-nonylphenyl 2,3-difluoro-4-nonyloxy benzoate,
12% of 4-heptylphenyl p-(4-octyloxyphenyl)-benzoate,
14% of 4'-octyloxybiphenyl-4-yl 4-heptyloxybenzoate,
7% of 4'-octylbiphenyl-4-yl 2,3-difluoro-4-nonyloxybenzoate,
5% of 4'-octyloxy-2,3-difluorobiphenyl-4-yl 2,3-difluoro-4-pentylbenzoate,
5% of 4'-octyloxy-2',3'-difluorobiphenyl-4-yl 4-nonyloxybenzoate,
11% of 4'-nonyloxybiphenyl-4-yl 4-heptyloxybenzoate and
14% of optically active p-(5-heptylpyrimidin-2-yl)phenyl 2-chloro-3-methylbutyrate has S*$_c$ 58 S$_A$ 66 Ch 78 I and a spontaneous polarization of 18 nC/cm$^2$ at room temperature.

EXAMPLE 9

A liquid-crystal medium consisting of
9% of 4-octyloxyphenyl 4-octyloxybenzoate,
12% of 4-nonyloxyphenyl 4-octyloxybenzoate,
8% of 4-nonyloxyphenyl 4-decyloxybenzoate,
10% of 4-decyloxyphenyl 4-decyloxybenzoate,
6% of 2,3-difluoro-4-octylphenyl 4-octyloxybenzoate,
8% of 2,3-difluoro-4-decylphenyl 4-octyloxybenzoate,
4% of 2,3-difluoro-4-octylphenyl 2-fluoro-4-octyloxybenzoate,
15% of 4'-heptyloxybiphenyl-4-yl 4-octyloxybenzoate,
18% of 4'-octyloxybiphenyl-4-yl 4-octyloxybenzoate and
10% of optically active butyl 2-[p-(5-nonylpyrimidin-2-yl)-phenoxy]-propionate has S*$_c$ 59 S$_A$ 67 Ch 78 I and a spontaneous polarization of 9 nC/cm$^2$ at room temperature.

EXAMPLE 10

A liquid-crystal medium consisting of
7% of 2-p-heptyloxyphenyl-5-octylpyrimidine,
11% of 2-p-octyloxyphenyl-5-octylpyrimidine,
6% of 2-p-hexyloxyphenyl-5-nonylpyrimidine,
14% of 2-p-nonyloxyphenyl-5-nonylpyrimidine,
5% of 4'-octyl-2,3-difluoro-4-octyloxybiphenyl,
7% of 4'-nonyl-2,3-difluoro-4-nonyloxybiphenyl,
8% of p-hexyloxyphenyl 4-pentyloxy-2,3-difluorobiphenyl-4'-carboxylate,
20% of r-1-cyano-cis-4-(4'-octyloxybiphenyl-4-yl)-1-octylcyclohexane,
12% of r-1-cyano-cis-4-(4'-octylbiphenyl-4-yl)-1-butylcyclohexane and
10% of optically active p-(5-heptylpyrimidin-2-yl)phenyl 2-cyano-2-methylhexanoate has S*$_c$ 59 S$_A$ 61 Ch 78 I and a spontaneous polarization of 18 nC/cm$^2$ at room temperature.

EXAMPLE 11

A liquid-crystal medium consisting of
8% of 2-p-octyloxyphenyl-5-octylpyrimidine,
12% of 2-p-nonyloxyphenyl-5-octylpyrimidine,
7% of 2-p-hexyloxyphenyl-5-nonylpyrimidine,
23% of 2-p-nonyloxyphenyl-5-nonylpyrimidine,
8% of 2-(2,3-difluoro-4-octyloxyphenyl)-5-nonyl-1,3,4-thiadiazole,
8% of 2-(2,3-difluoro-4-octyloxyphenyl)-5-heptyl-1,3,4-thiadiazole, 7% of 2-(p-pentyloxyphenyl)-5-(p-heptylphenyl)-1,3,4-thiadiazole, 7% of 2-(p-heptyloxyphenyl)-5-(p-heptylphenyl)-1,3,4-thiadiazole, 6% of 2-(p-heptyloxyphenyl)-5-(2,3-difluoro-4-heptylphenyl)-1,3,4-thiadiazole, 4% of 2-(4'-heptyloxy-2,3-difluorobiphenyl-4-yl)-5-pentyl-1,3,4-thiadiazole and 10% of optically active 4'-octyloxybiphenyl-4-yl 2-cyano-2-methylhexanoate has $S^*_C$ 66 $S_A$ 70 Ch 80 I and a spontaneous polarization of 21 nC/cm$^2$ at room temperature.

EXAMPLE 12

A liquid-crystal medium consisting of
3% of 2-p-heptyloxyphenyl-5-heptylpyrimidine,
4% of 2-p-nonyloxyphenyl-5-heptylpyrimidine,
11% of 2-p-octyloxyphenyl-5-nonylpyrimidine,
21% of 2-p-nonyloxyphenyl-5-nonylpyrimidine,
7% of 2-(2,3-difluoro-4-octyloxyphenyl)-5-octylpyrimidine,
8% of 2-(2,3-difluoro-4-nonyloxyphenyl)-5-nonylpyrimidine,
4% of 2-(2,3-difluoro-4-octyloxyphenyl)-5-octylpyrimidine,
7% of 2-(p-heptyloxyphenyl)-5-(p-pentylphenyl)-1,3,4-thiadiazole,
17% of r-1-cyano-cis-4-(4'-octyloxybiphenyl-4-yl)-1-octylcyclohexane,
8% of 2-(4'-pentyloxy-2,3-difluorobiphenyl-4-yl)-5-heptylpyrimidine and
10% of optically active p-(5-heptylpyrimidin-2-yl)phenyl 2-chloro-3-methylbutyrate has $S^*_C$ 62 $S_A$ 66 Ch 78 I and a spontaneous polarization of 14 nC/cm$^2$ at room temperature.

EXAMPLE 13

A liquid-crystal medium consisting of
8% of 2-p-octyloxyphenyl-5-octylpyrimidine,
12% of 2-p-nonyloxyphenyl-5-octylpyrimidine,
7% of 2-p-hexyloxyphenyl-5-nonylpyrimidine,
23% of 2-p-nonyloxyphenyl-5-nonylpyrimidine,
8% of 2-(2,3-difluoro-4-octyloxyphenyl)-5-nonyl-1,3,4-thiadiazole,
8% of 2-(2,3-difluoro-4-octyloxyphenyl)-5-heptyl-1,3,4-thiadiazole,
7% of 2-(p-pentyloxyphenyl)-5-(p-heptylphenyl)-1,3,4-thiadiazole,
7% of 2-(p-heptyloxyphenyl)-5-(p-heptylphenyl)-1,3,4-thiadiazole,
6% of 2-(p-heptyloxyphenyl)-5-(2,3-difluoro-4-heptylphenyl)-1,3,4-thiadiazole,
4% of 2-(4'-heptyloxy-2,3-difluorobiphenyl-4-yl)-5-pentyl-1,3,4-thiadiazole and
10% of optically active 4'-octyloxybiphenyl-4-yl 2-cyano-2-methylhexanoate has $S^*_C$ 66 $S_A$ 70 Ch 80 I and a spontaneous polarization of 21 nC/cm$^2$ at room temperature.

EXAMPLE 14

A liquid-crystal medium consisting of
3% of 2-p-heptyloxyphenyl-5-heptylpyrimidine,
4% of 2-p-nonyloxyphenyl-5-heptylpyrimidine,
11% of 2-p-octyloxyphenyl-5-nonylpyrimidine,
21% of 2-p-nonyloxyphenyl-5-nonylpyrimidine,
7% of 2-(2,3-difluoro-4-octyloxyphenyl)-5-octylpyrimidine,
8% of 2-(2,3-difluoro-4-nonyloxyphenyl)-5-nonylpyrimidine,
4% of 2-(2,3-difluoro-4-octyloxyphenyl)-5-octylpyridine,
7% of 2-(p-heptyloxyphenyl)-5-(p-pentylphenyl)-1,3,4-thiadiazole,
17% of r-1-cyano-cis-4-(4'-octyloxybiphenyl-4-yl)-1-octylcyclohexane,
8% of 2-(4'-pentyloxy-2,3-difluorobiphenyl-4-yl)-5-heptylpyrimidine and
10% of optically active p-(5-heptylpyrimidin-2-yl)phenyl 2-chloro-3-methylbutyrate has $S^*_C$ 62 $S_A$ 66 Ch 78 I and a spontaneous polarization of 14 nC/cm$^2$ at room temperature.

EXAMPLES 15 to 26

10% of the following doping agents A to L are added in each case to an achiral $S_C$ base mixture consisting of
4.4% of 2-p-heptyloxyphenyl-5-heptylpyrimidine,
4.4% of 2-p-octyloxyphenyl-5-heptylpyrimidine,
4.4% of 2-p-nonyloxyphenyl-5-heptylpyrimidine,
7.8% of 2-(2,3-difluoro-4-octyloxyphenyl)-5-heptylpyrimidine,
7.8% of 2-p-hexyloxyphenyl-5-nonylpyrimidine,
25.6% of 2-p-nonyloxyphenyl-5-nonylpyrimidine,
10.0% of 2-(2,3-difluoro-4-nonyloxyphenyl)-5-nonylpyrimidine,
8.9% of 2-(p-hexyloxyphenyl)-5-(p-heptylphenyl)-1,3,4-thiadiazole,
11.1% of r-1-cyano-cis-4-(4'-octyloxybiphenyl-4-yl)-1-octylcyclohexane,
8.9% of 2-(4'-hexyloxy-2,3-difluorobiphenyl-4-yl)-5-heptylpyrimidine and
6.7% of 2-(2,3-difluoro-4-pentyloxyphenyl)-5-(p-heptylphenyl)-1,3,4-thiadiazole.

The phase transition temperatures and values of spontaneous polarization at room temperature are collated in the following table:

| Example | Doping agent | $S^*_C$ | $S_A$ | Ch | I | $P_s$ (nC/cm$^2$) |
|---|---|---|---|---|---|---|
| 15 | A | 65 | | 70 | 81 | 20 |
| 16 | B | 62 | | — | 78 | 11 |
| 17 | C | 56 | | 61 | 74 | 21 |
| 18 | D | 67 | | 72 | 84 | 14 |
| 19 | E | 62 | | 64 | 75 | 10 |
| 20 | F | 70 | | 73 | 87 | 17 |
| 21 | G | 63 | | 67 | 78 | 12 |
| 22 | H | 64 | | — | 79 | 12 |
| 23 | I | 51 | | 58 | 73 | 11 |
| 24 | J | 60 | | 65 | 76 | 10 |
| 25 | K | 58 | | 62 | 77 | 25 |
| 26 | L | 72 | | 78 | 88 | 18 |

Nature of the doping agents

A: 4'-heptyloxy-2,3-difluorobiphenyl-4-yl 2-butyl-2-methylcyanoacetate

B: ethyl 2-[4-(p-heptyloxyphenyl)-2,3-difluorophenoxy]propionate

C: 1-cyanoethyl 4'-heptyloxy-2,3-difluorobiphenyl-4-carboxylate

D: 4-(p-heptyloxyphenyl)-2,3-difluorophenyl 2-chloro-3-methylbutyrate

E: 4'-heptyloxy-2,3-difluoro-4-(1-valeroyloxy-2-propyloxy)-biphenyl

F: ethyl 2-[4-(4'-nonyloxy-2',3'-difluorobiphenyl-4-yl-phenoxy]-propionate

G: 2-cyano-2-methylhexyl 4'-heptyloxy-2,3-difluorobiphenyl-4-carboxylate

H: ethyl 2-[4-(p-heptyloxyphenyl)-2,3-difluorobenzoyloxy]-propionate
I: 4'-heptyloxy-2,3-difluoro-4-(1-cyanoethoxy)-biphenyl
J: 4'-heptyloxy-2,3-difluoro-4-(2-valeroyloxypropyl)-biphenyl
K: 1-cyano-2-methylpropyl 4'-heptyloxy-2',3'-difluorobipenyl-4-carboxylate
L: ethyl 2-[2,3-difluoro-4-(p-(p-heptyloxyphenyl)benzoyloxy)-phenoxy]-propionate

EXAMPLE 27

A liquid-crystal medium consisting of
12.5% of 4-heptyloxy-2,3-difluorophenyl 4-(p-octyloxyphenyl)-benzoate,
14.2% of 4-heptyloxy-2,3-difluorophenyl p-octyloxybenzoate,
12.5% of 4-heptyl-2-fluorophenyl 4-(p-heptyloxyphenyl)benzoate,
12.5% of 4-heptyl-2-fluorophenyl 4-(4-heptyloxy-3-fluorophenyl)-benzoate,
14.2% of 4-octyloxy-3-fluorophenyl p-octyloxybenzoate,
12.34% of 4-pentyl-2-fluorophenyl p-octyloxybenzoate,
14.24% of 4-octyloxy-3-fluorophenyl p-hexyloxybenzoate,
5.04% of optically active p-(2-methylbutyl)-phenyl 4-(p-octylphenyl)-benzoate and
2.48% of optically active 1-cyano-2-methylpropyl 4-(p-octyloxy)-benzoate
has $S^*_c$ 66.4 $S_A$ 73 Ch 97 I and a spontaneous polarization of 9 nC/cm$^2$ at 30° C.

EXAMPLE 28

A liquid-crystal medium consisting of
16.87% of 4-octyl-2-fluorophenyl 4-(4-octyloxy-2,3-difluorophenyl)-benzoate,
9% of 4-heptyl-3-fluorophenyl 4-(4-octyloxy-2,3-difluorophenyl)-benzoate,
16.87% of 4-heptyl-2-fluorophenyl 4-(p-heptyloxyphenyl)-benzoate,
16.87% of 4-heptyloxy-2-fluorophenyl 4-(4-heptyloxy-3-fluorophenyl)-benzoate,
14% of 4-octyloxy-3-fluorophenyl p-octyloxybenzoate,
10% of 4-pentyl-2-fluorophenyl p-octyloxybenzoate,
14% of 4-octyloxy-3-fluorophenyl p-hexyloxybenzoate, and
2.4% of optically active 1-cyano-2-methylpropyl 4-(p-octyloxy)-benzoate
has $S^*_c$ 71.8 $S_A$ 81 Ch 102 I.

EXAMPLE 29

A liquid-crystal medium consisting of
8% of 2-(4-heptyloxy-2,3-difluorophenyl)-5-nonylpyrimidine,
9% of 2-(4-nonyloxy-2,3-difluorophenyl)-5-nonylpyrimidine,
17% of 2-(p-hexyloxyphenyl)-5-nonylpyrimidine,
17% of 2-(p-heptyloxyphenyl)-5-nonylpyrimidine,
17% of 2-(p-octyloxyphenyl)-5-nonylpyrimidine,
17% of 2-(p-nonyloxyphenyl)-5-nonylpyrimidine and
15% of optically active 2-(p-n-octyloxyphenyl)-5-(3-fluoro-n-nonyl)-pyridine
has $S^*_c$ 63 $S_A$ 70 I and a switching time of 30 μs at 20° C. and 15 V/μm.

EXAMPLE 30

A liquid-crystal medium consisting of
8% of 2-(4-heptyloxy-2,3-difluorophenyl)-5-nonylpyrimidine,
9% of 2-(4-nonyloxy-2,3-difluorophenyl)-5-nonylpyrimidine,
6% of 2-(p-octyloxyphenyl)-5-pentylpyrimidine,
6% of 2-(p-hexyloxyphenyl)-5-hexylpyrimidine,
6% of 2-(p-ethoxyphenyl)-5-heptylpyrimidine,
12% of 2-(p-hexyloxyphenyl)-5-nonylpyrimidine,
12% of 2-(p-heptyloxyphenyl)-5-nonylpyrimidine,
13% of 2-(p-octyloxyphenyl)-5-nonylpyrimidine,
13% of 2-(p-nonyloxyphenyl)-5-nonylpyrimidine and
15% of optically active 2-(p-n-octyloxyphenyl)-5-(3-fluoro-n-nonyl)-pyridine
has $S^*_c$ 50 $S_A$ 64 Ch 67 I and a spontaneous polarization of 14 nC/cm$^2$ at 20° C.

EXAMPLE 31

A liquid-crystal medium consisting of
17.5% of 2-fluoro-4-heptylphenyl p-(3-fluoro-4-octyloxyphenyl)-benzoate,
17.5% of 2,3-difluoro-4-octyloxy-4'-octanoyloxybiphenyl,
17.5% of 2,3-difluoro-4-octyloxy-4'-decanoyloxybiphenyl
12.5% of 3-fluoro-4-heptylphenyl p-(2,3-difluoro-4-octyloxyphenyl)-benzoate,
15% of 3-fluoro-4-octyloxyphenyl p-octyloxybenzoate,
15% of 3-fluoro-4-octyloxyphenyl p-hexyloxybenzoate,
5% of 2-fluoro-4-pentylphenyl p-octyloxybenzoate and
2.4% optical active 1-cyano-2-methylpropyl p-(p-octyloxyphenyl)-benzoate
$S^*_c$ 65 $S_A$ 76 N 80 I and a spontaneous polarization of 8.7 nC/cm$^2$ at 30° C.

EXAMPLE 32

A liquid-crystal medium consisting of
12.17% of 2-fluoro-4-heptylphenyl p-(3-fluoro-4-octyloxyphenyl)-benzoate,
12.17% of 2-fluoro-4-heptylphenyl p-(p-heptyloxyphenyl)benzoate,
12.17% of 2,3-difluoro-4-heptyloxyphenyl p-(3-fluoro-4-octyloxyphenyl)-benzoate,
13.83% of 3-fluoro-4-octyloxyphenyl p-octyloxybenzoate,
13.83% of 2,3-difluoro-4-octyloxyphenyl p-octyloxybenzoate,
13.96% of 3-fluoro-4-octyloxyphenyl p-hexyoxybenzoate (sic),
9.0% of 2-methylbutyl p-[p-(p-octyloxybenzoyloxy)-phenyl]-benzoate,
2.42% of optically active 1-cyano-2-methylpropyl p-(p-octyloxyphenyl)-benzoate,
0.45% of optically active 1-cyanoethyl p-(3-fluoro-4-octyloxyphenyl)-benzoate and
10.0% of 2-fluoro-4-pentylphenyl p-octyloxybenzoate
has $S^*_c$ 64.9 $S_A$ 77.8 N 94 I and a spontaneous polarization of 12.9 nC/cm$^2$ at 30° C.

EXAMPLE 33

A liquid-crystal medium consisting of
16.2% of trans-4-heptylcyclohexyl p-(2,3-difluoro-4-octyloxyphenyl)-benzoate,
16.2% of trans-4-heptylcyclohexyl p-(3-fluoro-4-octyloxyphenyl)-benzoate,
16.2% of 2-fluoro-4-heptylphenyl p-(3-fluoro-4-octyloxyphenyl)-benzoate,
15.0% of 3-fluoro-4-octyloxyphenyl p-octyloxybenzoate, 14.0% of 3-fluoro-4-octyloxyphenyl p-hexyloxybenzoate, 20% of 2-fluoro-4-pentylphenyl p-octyloxybenzoate and 2.4% of optically active 1-cyano-2-methylpropyl p-(p-octyloxyphenyl)-benzoate has S*$_c$ 61.4 S$_A$ 82.1 N 98.6 I and a spontaneous polarization of 6.2 nC/cm$^2$ at 20° C.

We claim:

1. A chiral, tilted smectic liquid-crystal medium comprising an achiral base material and at least one chiral doping agent, wherein said achiral base material of said medium contains at least one achiral compound having the structural unit 2,3-difluoro-1,4-phenylene, and said at least one achiral compound is a compound of formula I

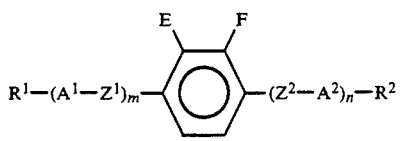

wherein

R$^1$ and R$^2$ are each independently alkyl having 1 to 15 C atoms or alkenyl having 3-15 C atoms, wherein in each case a CH$_2$ group can be replaced by —O—, —CO—, —O—CO, —CO—O— or —O—CO—O—;

A$^1$ and A$^2$, independently of one another, are each 1,4-phenylene wherein one or two CH groups can also be replaced by N, 1,4-cyclohexylene wherein one or two adjacent CH$_2$ groups can also each independently be replaced by O or S, piperidine-1,4-diyl, 1,4-bicyclo(2,2,2)-octylene, 1,3,4-thiadiazole-2,5-diyl, naphthalene-2,6-diyl or 1,2,3,4-tetrahydronaphthalene-2,6-diyl, each of which is unsubstituted or substituted by one or two F and/or Cl atoms and/or CH$_3$ groups and/or CN groups;

Z$^1$ and Z$^2$ are each —CO—O—, —O—CO, —CH$_2$CH$_2$—, —OCH$_2$—, —CH$_2$O—, —C≡C— or a single bond;

m and n are each 0, 1 or 2; and (m+n) is 1 or 2, subject to the proviso that one or two of the groups Z$^1$ and/or Z$^2$ present in the molecule of the formula I are —CO—O—, —O—C)—, —CH$_2$CH$_2$—, —OCH$_2$—, —CH$_2$O— or —C≡C—, if A$^1$ and A$^2$ independently of one another are each 1,4-phenylene which is unsubstituted or substituted by one or two F atoms.

2. A medium according to claim 1, wherein said medium contains 2 to 25% of said chiral doping agent.

3. A medium according to claim 2, wherein said doping agent has an S$_c$* phase.

4. A medium according to claim 1, wherein said medium contains 8 to 50% of one or more of said compound having the structural unit 2,3-difluoro-1,4-phenylene.

5. A medium according to claim 1, wherein said medium contains one or more compounds of the formulae

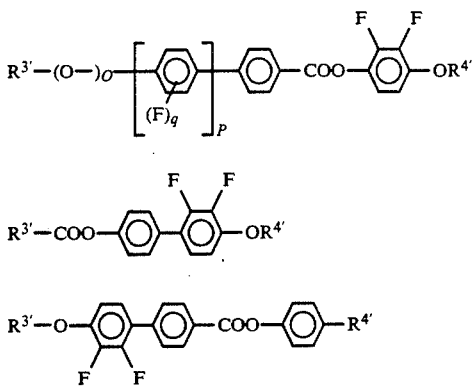

wherein

R$^3'$ and R$^4'$ independently of one another are each alkyl having 1 to 15 C atoms, and o, p and q are each 0 are each 0 or 1.

6. In an electrooptical display element containing a dielectric, the improvement wherein said dielectric is a medium according to claim 1, 7. A medium according to claim 1, wherein said medium contains 8–50% of one or more of said compounds having a structural unit 2,3-difluoro-1,4-phenylene.

8. A medium according to claim 7, wherein said one or more compounds is of the formula

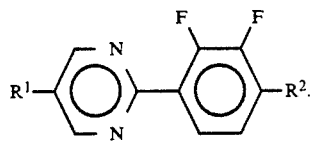

9. A chiral, tilted smectic liquid-crystal medium comprising an achiral base material and at least one chiral doping agent, wherein said achiral base material of said medium contains at least one achiral compound having the structural unit 2,3-difluoro-1,4-phenylene, and wherein said medium contains at least 25% of one or more compounds of formula II

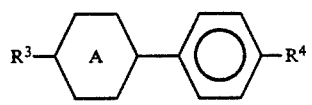

wherein

R$^3$ and R$^4$, independently of one another, ar each alkyl which has 1 to 15 C atoms or alkenyl which has 3 to 15 C atoms, each of which is unsubstituted, monosubstituted by cyano or substituted by fluorine or chlorine, wherein in each case a CH$_2$ group can be replaced by —O—, —CO—, —O—CO—, —CO—O , or —O—CO—O— in each of these radicals, and Ring A is pyrimidine-2,5-diyl or pyridine-2,5-diyl; with the proviso that said at least one achiral compound is not a fluorinated oligophenyl of the formula 1

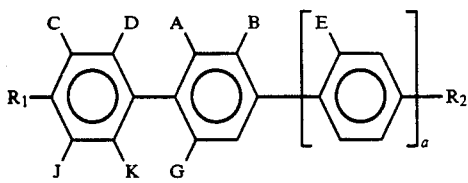

(1)

wherein a is 0 or 1; wherein the terminal substituents
$R_1$ and $R_2$ are each independently alkyl or alkenyl having up to 15 C atoms, unsubstituted or substituted by CN or by at least one halogen atoms, and in which one or more non-adjacent $CH_2$ groups can be replaced by —O—, —S—, —CO—, —O—CO—, —CO—O—, —O—CO—O—, or —C≡C—; one of $R_1$ and $R_2$ can also be

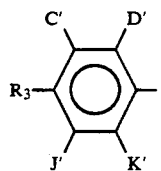

wherein
$R_3$ is alkyl or alkenyl having up to 15 C atoms, unsubstituted or substituted by CN or by at least one halogen atoms, and in which one or more nonadjacent $CH_2$ groups can be replaced by —O—, —S—, —CO—, —O—CO—, —CO—O—, —CO—O—, —O—CO—O— or —C≡C—; and in one of the following pairs of lateral substituents the two substituents are both fluorine;
(A,B), (C,D), (C',D')
and all remaining lateral substituents are hydrogen or fluorine.

10. A medium according to claim 9, wherein said medium contains one or more compounds of formulas

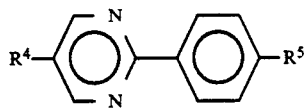

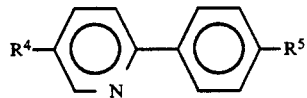

wherein $R^4$ and $R^5$ are, independently of one another, each alkyl, alkoxy, alkanoyloxy or alkoxycarbonyl having in each case 3 to 12 C atoms.

11. A medium according to claim 9, wherein said medium contains 2 to 25% of said chiral doping agent.

12. A medium according to claim 9, wherein said medium contains 8 to 50% of one or more of said compounds having the structural unit 2,3-difluoro-1,4-phenylene.

13. A medium according to claim 11, wherein said doping agent has an $S_C^*$ phase.

14. In an electrooptical display element containing a dielectric, the improvement wherein said dielectric is a medium according to claim 9.

* * * * *